(12) United States Patent
Wilson et al.

(10) Patent No.: US 9,224,421 B2
(45) Date of Patent: Dec. 29, 2015

(54) NON-DECISION DIRECTED MAGNETORESISTIVE ASYMETRY ESTIMATION

(71) Applicant: LSI Corporation, San Jose, CA (US)

(72) Inventors: Bruce A. Wilson, San Jose, CA (US); Nayak Ratnakar Aravind, Allentown, PA (US); Haitao Xia, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/200,228

(22) Filed: Mar. 7, 2014

(65) Prior Publication Data

US 2015/0255109 A1 Sep. 10, 2015

(51) Int. Cl.
*G11B 5/02* (2006.01)
*G11B 20/10* (2006.01)
*G11B 5/012* (2006.01)

(52) U.S. Cl.
CPC .......... *G11B 20/10324* (2013.01); *G11B 5/012* (2013.01); *G11B 20/10027* (2013.01); *G11B 20/10037* (2013.01)

(58) Field of Classification Search
CPC ............ G11B 5/012; G11B 5/03; G11B 5/39; G11B 20/10009; G11B 20/10037; G11B 20/10027; G11B 20/10324
USPC .......... 360/25, 39, 46, 53, 55, 62, 66, 68, 313
See application file for complete search history.

(56) References Cited

U.S. PATENT DOCUMENTS

| | | | | |
|---|---|---|---|---|
| 5,121,260 | A * | 6/1992 | Asakawa et al. | 360/31 |
| 5,986,990 | A * | 11/1999 | Moon | 369/59.16 |
| 6,396,776 | B1 * | 5/2002 | Ueyanagi | 369/13.33 |
| 6,449,110 | B1 * | 9/2002 | DeGroat et al. | 360/46 |
| 7,012,772 | B1 * | 3/2006 | Vis | 360/46 |
| 7,203,155 | B2 * | 4/2007 | Nakamura et al. | 369/283 |
| 2004/0021977 | A1 * | 2/2004 | Lim et al. | 360/77.04 |
| 2005/0265199 | A1 * | 12/2005 | Nakano et al. | 369/59.22 |
| 2007/0146920 | A1 * | 6/2007 | Kitamura et al. | 360/53 |
| 2009/0268324 | A1 * | 10/2009 | Iben | 360/31 |
| 2009/0268325 | A1 * | 10/2009 | Iben et al. | 360/31 |

* cited by examiner

*Primary Examiner* — Thomas Alunkal

(57) ABSTRACT

Systems and methods for magnetoresistive asymmetry estimation may include, but are not limited to, operations for: receiving a magnetic read head transducer output; computing a mean value of the magnetic read head transducer output; computing a median value of the magnetic read head transducer output; and applying a correction coefficient to a magnetic read head detector input according to at least the mean value of the magnetic read head transducer output and the median value of the magnetic read head transducer output.

18 Claims, 4 Drawing Sheets

NON-DECISION DIRECTED MAGNETORESISTIVE ASYMETRY ESTIMATION

FIELD OF THE INVENTION

The present invention is directed to systems and methods for magnetoresistive asymmetry (MRA) estimation.

SUMMARY

Systems and methods for magnetoresistive asymmetry estimation may include, but are not limited to, operations for: receiving a magnetic read head transducer output; computing a mean value of the magnetic read head transducer output; computing a median value of the magnetic read head transducer output; and applying a correction coefficient to a magnetic read head detector input according to at least the mean value of the magnetic read head transducer output and the median value of the magnetic read head transducer output.

BRIEF DESCRIPTION OF FIGURES

The numerous advantages of the disclosure may be better understood by those skilled in the art by referencing the accompanying figures in which.

DETAILED DESCRIPTION

Figure 1:
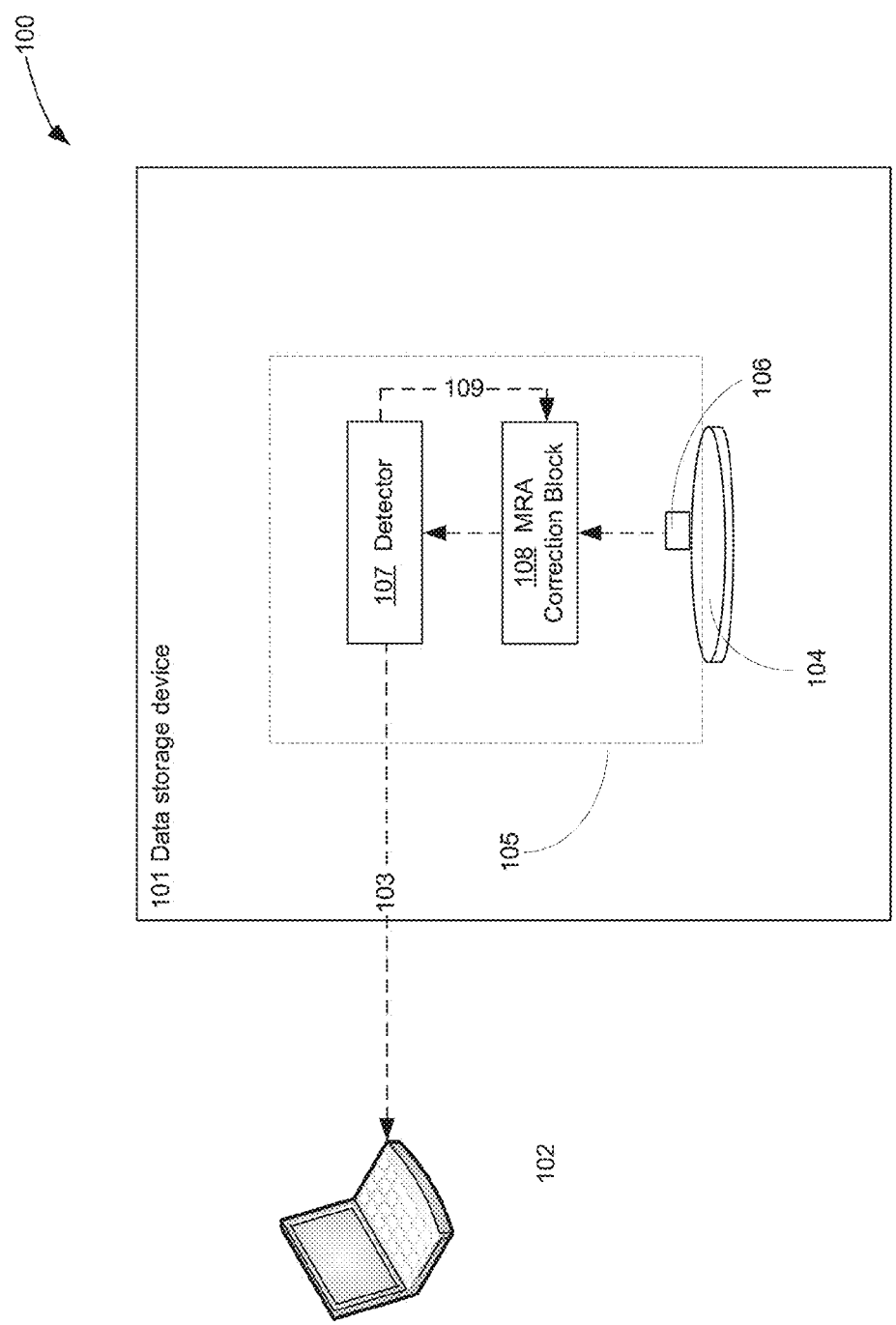
FIG. 1 illustrates a data storage system.

Referring to FIG. 1, a data storage system 100 is shown. The data storage system 100 may include a data storage device 101 operably coupled to a host device 102 (e.g. a personal computing device, a RAID controller, mobile communications device, and the like). The host device 102 may transceive read/write signals via a signal path 103 interconnecting the host device 102 and the data storage device 101.

The data storage device 101 may be a magnetic recording storage device, (e.g. a hard drive, a component drive of a redundant array of independent disks (RAID), or any other magnetic recording medium) including a magnetically recordable media 104 readable by a read head 105. The read head 105 may include one or more transducers 106 and a detector 107 configured to translate magnetically recorded data stored on the magnetically recordable media 104 into the signal path 103 for transmission to the host device 102.

Figure 2:
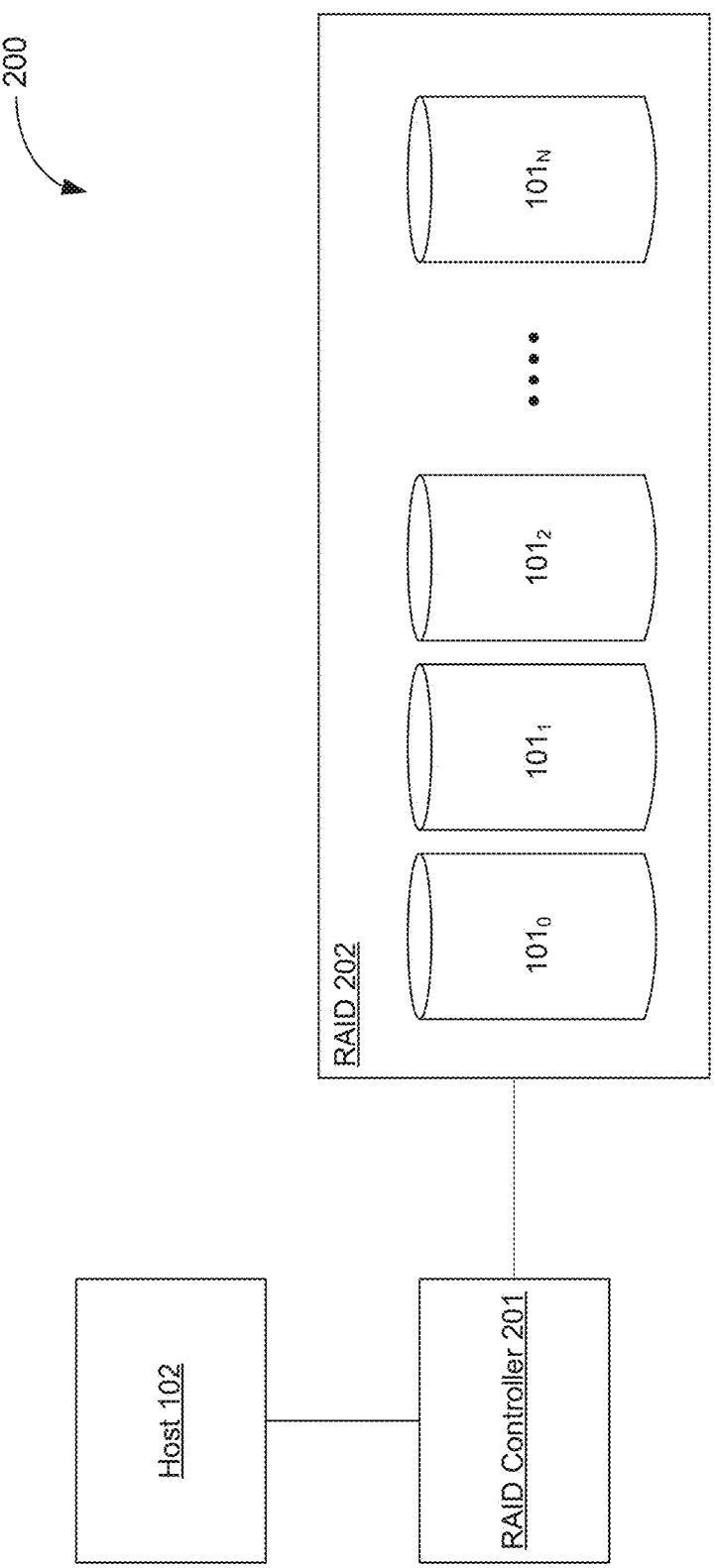
FIG. 2 illustrates a RAID storage system.

In a specific embodiment, as shown in FIG. 2, a RAID system 200 comprising the host device 102, a RAID controller 202, and a RAID 203 is shown. The RAID 203 may include N storage devices including, but not limited to, hard-disk drives, solid-state drives, or a combination thereof, where N is any number greater than one. A data storage device 101 incorporating the magnetically recordable media 104 and the read head 105 including the transducers 106 may be incorporated as a component storage device in the RAID 203. The RAID controller 202 may include volume management circuitry/software whereby the RAID controller 202 can process read/write requests of the host device 102 accessing various logical volumes configured on the RAID 203.

Such transducers 106 in read heads used for magnetic recording may be non-linear in nature and, as such, may exhibit magnetoresistive asymmetry (MRA) distortion. MRA distortion may be modeled as a quadratic nonlinearity that adds a scaled and squared signal component back to a read signal path (e.g. signal path 103).

To compensate for this distortion, read channels may include an MRA correction block 108. This MRA correction block 108 may apply a correction coefficient to be programmed appropriately for proper functioning. The coefficient may be set using a decision-directed feedback loop 109 that employs decisions by the detector 107 to modify the input to the detector 107. Such a method relies on good detector 107 decision quality and may converge relatively slowly. With unstable transducers 106 that exhibit sudden changes in distortion, such a decision-directed approach may be problematic as the MRA correction block 108 may not be able to respond in a timely manner. As such a non-decision-directed approach may be employed.

Figure 3:
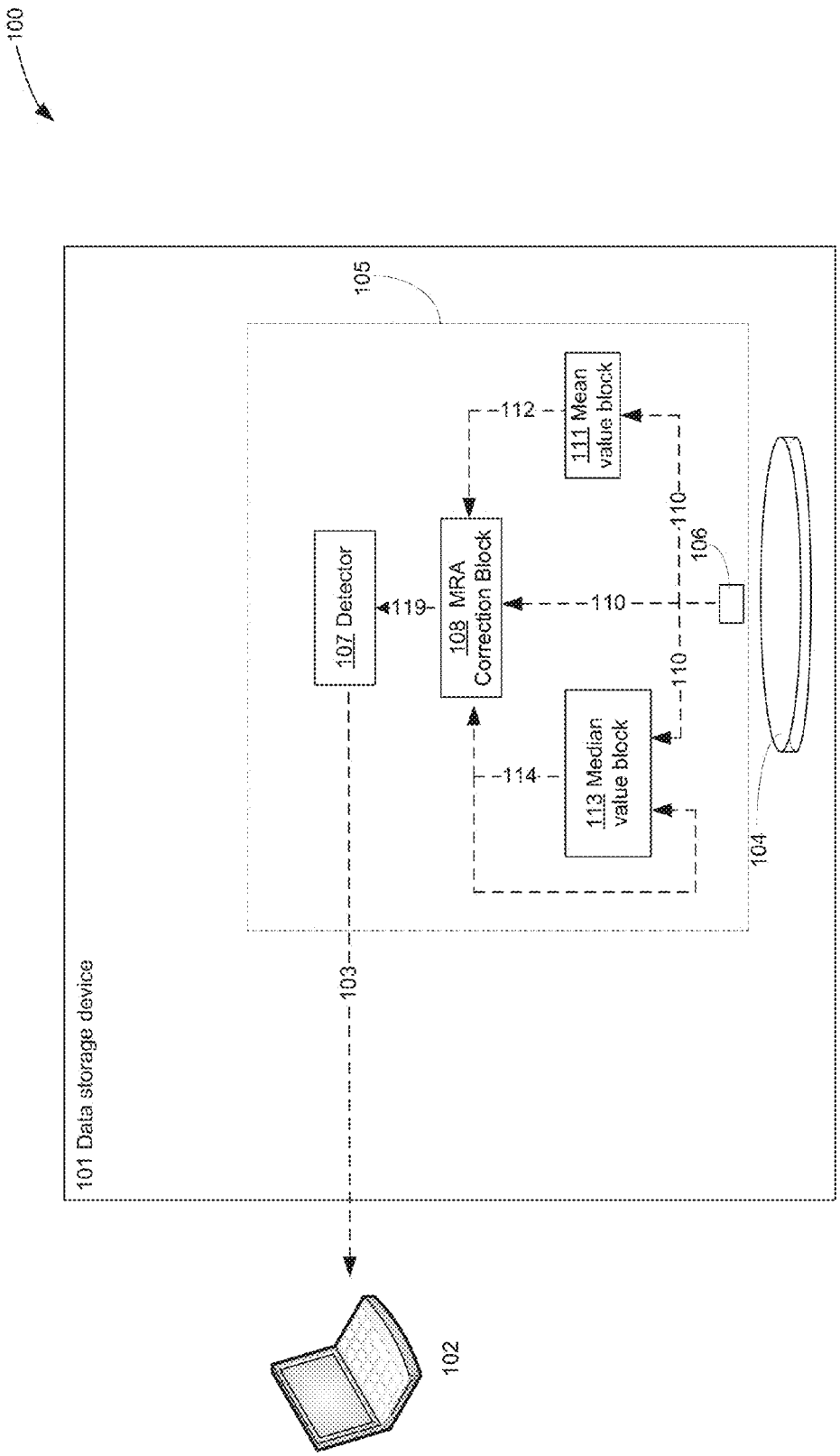
FIG. 3 illustrates a data storage system.

For example, as shown in FIG. 3, instead of directly using detector 107 decisions to estimate an amount of MRA distortion present in a read signal path 103, the properties of the read signal path 103 itself may be analyzed. Specifically, an amount of MRA distortion may be estimated as a scaled difference between the mean and median of an output signal 110 from the transducers 106.

The mean of the detector output signal 110 may be computed using direct averaging of the output signal 110. For example, as shown in FIG. 3, an mean value computation block 111 may receive the detector output signal 110 and compute a mean value 112 of the detector output signal 110 over a given time period.

Figure 4:
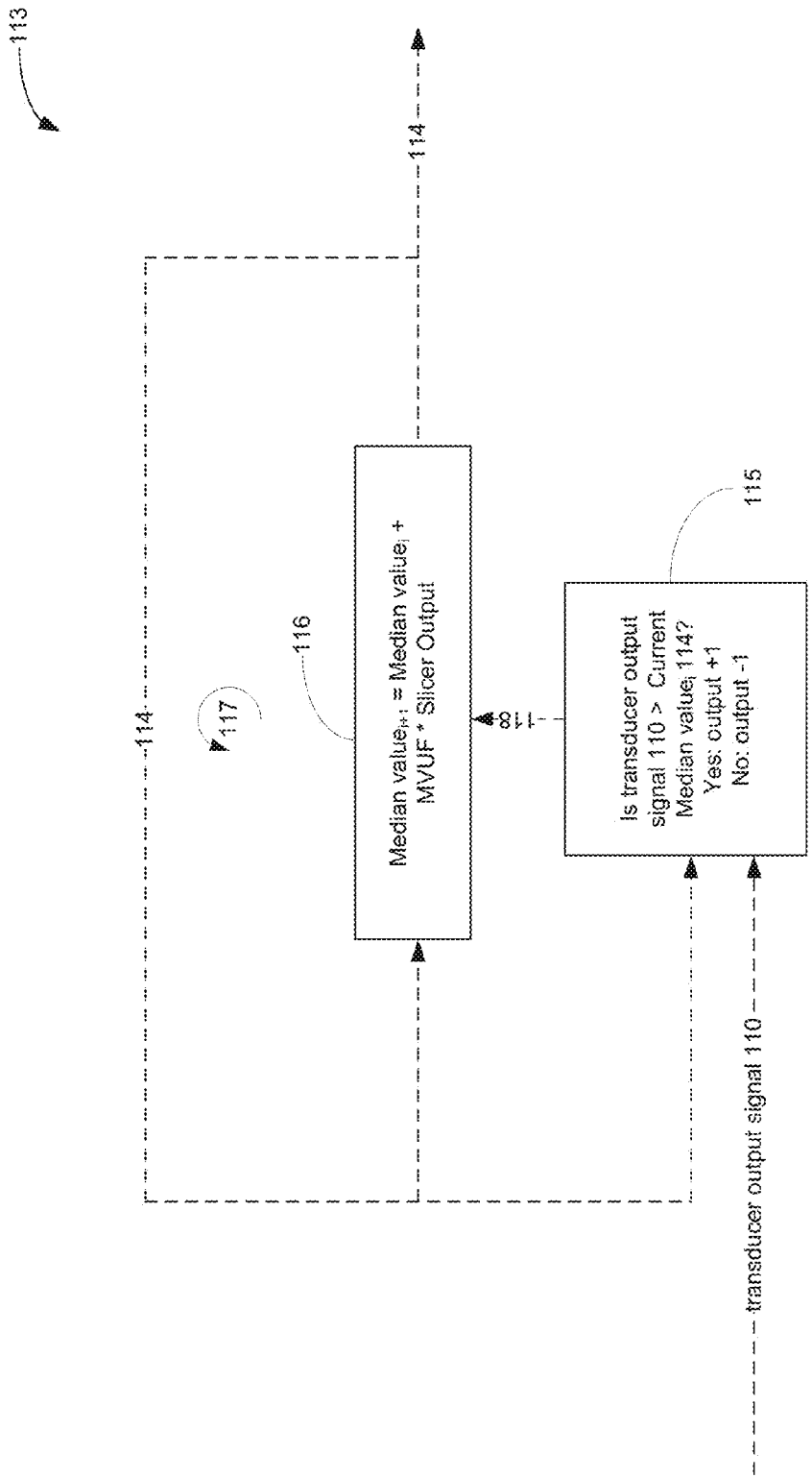
FIG. 4 illustrates a median value computation block.

Further, in order to compute a median value of the detector output signal 110, samples of the output signal 110 may be sorted and the median value selected. In another embodiment, as shown in FIGS. 3 and 4, a median value computation block 113 may be employed to obtain a median value 114. As shown in FIG. 4, the median value computation block 113 may include a slicer 115 and a median value update block 116 in a negative feedback loop 117. The median value computation block 113 may update the median value 114 via the negative feedback loop 117 by incrementally adjusting the median value 114 according to the value of the detector output signal 110. For example, the median value 114 may be increased by a median value update factor (MVUF) if an update flag specified by the slicer output 118 is has a first value (e.g. a value of +1) or the median value 114 may be decreased by the MVUF if the update flag defined by the slicer output 118 has a second value (e.g. a value of −1).

With an appropriately chosen median value update factor (MVUF) (e.g. a 2% adjustment factor), the median value 114 may converge (e.g. by an end of a signal sector or fragment) to the median of all the samples in the sector or fragment.

Referring again to FIG. 3, once the mean value 112 and median value 114 are computed, the mean value 112 and median value 114 may be provided to the MRA correction block 108. The MRA correction block 108 may compute an estimated amount of MRA distortion as a scaled difference between the mean value 112 and the median value 114. This scaled difference between the mean value 112 and the median value 114 may then be used to program an MRA correction coefficient applied to an input 119 of the detector 107 via the MRA correction block 108 in order to correct for any MRA distortion introduced into the read signal path 103 by the transducers 106.

It is believed that the present disclosures and many of their attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

The foregoing detailed description may include set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein may be capable of being distributed as a program product in a variety of forms, and that an illustrative embodiment of the subject matter described herein applies regardless of the particular type of signal bearing medium used to actually carry out the distribution. Examples of a signal bearing medium include, but may be not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

Those having skill in the art will recognize that the state of the art has progressed to the point where there may be little distinction left between hardware, software, and/or firmware implementations of aspects of systems; the use of hardware, software, and/or firmware may be generally (but not always, in that in certain contexts the choice between hardware and software may become significant) a design choice representing cost vs. efficiency tradeoffs. Those having skill in the art will appreciate that there may be various vehicles by which processes and/or systems and/or other technologies described herein may be effected (e.g., hardware, software, and/or firmware), and that the preferred vehicle will vary with the context in which the processes and/or systems and/or other technologies may be deployed. For example, if an implementer determines that speed and accuracy may be paramount, the implementer may opt for a mainly hardware and/or firmware vehicle; alternatively, if flexibility may be paramount, the implementer may opt for a mainly software implementation; or, yet again alternatively, the implementer may opt for some combination of hardware, software, and/or firmware. Hence, there may be several possible vehicles by which the processes and/or devices and/or other technologies described herein may be effected, none of which may be inherently superior to the other in that any vehicle to be utilized may be a choice dependent upon the context in which the vehicle will be deployed and the specific concerns (e.g., speed, flexibility, or predictability) of the implementer, any of which may vary. Those skilled in the art will recognize that optical aspects of implementations will typically employ optically oriented hardware, software, and or firmware.

What is claimed is:

1. A computing-device implemented method comprising:
    receiving a magnetic read head transducer output;
    computing a mean value of the magnetic read head transducer output;
    computing a median value of the magnetic read head transducer output, wherein the computing a median value of the magnetic read head transducer output includes:
        receiving a current estimate of the median value of the magnetic read head transducer output;
        comparing the current estimate of the median value of the magnetic read head transducer output to the magnetic read head transducer output; and
        generating an updated estimate of the median value of the magnetic read head transducer output according to the comparison; and
    applying a correction coefficient to a magnetic read head detector input according to at least the mean value of the magnetic read head transducer output and the median value of the magnetic read head transducer output.

2. The computing-device implemented method of claim 1, wherein the computing a median value of the magnetic read head transducer output includes:
    sorting a plurality of samples of the magnetic read head transducer output; and
    selecting a median value from sorted samples of the magnetic read head transducer output.

3. The computing-device implemented method of claim 1, wherein the comparing the current estimate of the median value of the magnetic read head transducer output to the magnetic read head transducer output includes:
    setting an update value as a first value when the median value of the magnetic read head transducer output is greater than the magnetic read head transducer output; and
    setting the update value as a second value different than the first value when the median value of the magnetic read head transducer output is greater than the magnetic read head transducer output.

4. The computing-device implemented method of claim 3, wherein the generating an updated estimate of the median value of the magnetic read head transducer output according to the comparison includes:
    computing an updated median value of the magnetic read head transducer output according to the update value.

5. The computing-device implemented method of claim 4, wherein the computing an updated median value of the magnetic read head transducer output according to the update value includes:
    computing an updated median value of the magnetic read head transducer as a sum of:
        the median value of the magnetic read head transducer; and
        a product of the update value and a mean value update coefficient.

6. The computing-device implemented method of claim 5, wherein the applying a correction coefficient to a magnetic read head detector input according to at least the mean value of the magnetic read head transducer output and the median value of the magnetic read head transducer output includes:

computing a difference between the mean value of the magnetic read head transducer and the updated median value of the magnetic read head transducer; and computing the correction coefficient by scaling the difference.

7. The computing-device implemented method of claim 1, wherein the applying a correction coefficient to a magnetic read head detector input according to at least the mean value of the magnetic read head transducer output and the median value of the magnetic read head transducer output includes:

computing a difference between the mean value of the magnetic read head transducer and the median value of the magnetic read head transducer; and computing the correction coefficient by scaling the difference.

8. A system comprising:

at least one computing device; and one or more instructions which, when implemented in the at least one computing device, configure the at least one computing device for at least:

receiving a magnetic read head transducer output;

computing a mean value of the magnetic read head transducer output;

computing a median value of the magnetic read head transducer output, wherein the computing a median value of the magnetic read head transducer output includes:

receiving a current estimate of the median value of the magnetic read head transducer output;

comparing the current estimate of the median value of the magnetic read head transducer output to the magnetic read head transducer output; and generating an updated estimate of the median value of the magnetic read head transducer output according to the comparison; and applying a correction coefficient to a magnetic read head detector input according to at least the mean value of the magnetic read head transducer output and the median value of the magnetic read head transducer output.

9. The system of claim 8, wherein the comparing the current estimate of the median value of the magnetic read head transducer output to the magnetic read head transducer output includes:

setting an update value as a first value when the median value of the magnetic read head transducer output is greater than the magnetic read head transducer output; and setting the update value as a second value different than the first value when the median value of the magnetic read head transducer output is greater than the magnetic read head transducer output.

10. The system of claim 9, wherein the generating an updated estimate of the median value of the magnetic read head transducer output according to the comparison includes:

computing an updated median value of the magnetic read head transducer output according to the update value.

11. The system of claim 10, wherein the computing an updated median value of the magnetic read head transducer output according to the update value includes:

computing an updated median value of the magnetic read head transducer as a sum of:

the median value of the magnetic read head transducer; and a product of the update value and a mean value update coefficient.

12. The system of claim 11, wherein the applying a correction coefficient to a magnetic read head detector input according to at least the mean value of the magnetic read head transducer output and the median value of the magnetic read head transducer output includes:

computing a difference between the mean value of the magnetic read head transducer and the updated median value of the magnetic read head transducer; and computing the correction coefficient by scaling the difference.

13. The system of claim 8, wherein the system further comprises:

a plurality of data storage devices configured as a redundant array of independent disks (RAID), wherein at least one data storage device of the plurality of data storage devices includes the magnetic read head transducer.

14. A system comprising:

circuitry for receiving a magnetic read head transducer output;

circuitry for computing a mean value of the magnetic read head transducer output;

circuitry for computing a median value of the magnetic read head transducer output, wherein the computing a median value of the magnetic read head transducer output includes:

circuitry for receiving a current estimate of the median value of the magnetic read head transducer output;

circuitry for comparing the current estimate of the median value of the magnetic read head transducer output to the magnetic read head transducer output; and circuitry for generating an updated estimate of the median value of the magnetic read head transducer output according to the comparison; and circuitry for applying a correction coefficient to a magnetic read head detector input according to at least the mean value of the magnetic read head transducer output and the median value of the magnetic read head transducer output.

15. The system of claim 14, wherein the circuitry for comparing the current estimate of the median value of the magnetic read head transducer output to the magnetic read head transducer output includes:

circuitry for setting an update value as a first value when the median value of the magnetic read head transducer output is greater than the magnetic read head transducer output; and circuitry for setting the update value as a second value different than the first value when the median value of the magnetic read head transducer output is greater than the magnetic read head transducer output.

16. The system of claim 15, wherein the circuitry for generating an updated estimate of the median value of the magnetic read head transducer output according to the comparison includes:

circuitry for computing an updated median value of the magnetic read head transducer output according to the update value.

17. The system of claim 16, wherein the circuitry for computing an updated median value of the magnetic read head transducer output according to the update value includes:

circuitry for computing an updated median value of the magnetic read head transducer as a sum of:

the median value of the magnetic read head transducer; and a product of the update value and a mean value update coefficient.

18. The system of claim 17, wherein the circuitry for applying a correction coefficient to a magnetic read head detector input according to at least the mean value of the magnetic read head transducer output and the median value of the magnetic read head transducer output includes:
- circuitry for computing a difference between the mean value of the magnetic read head transducer and the updated median value of the magnetic read head transducer; and
- circuitry for computing the correction coefficient by scaling the difference.

* * * * *